United States Patent
Oleynik et al.

(10) Patent No.: US 8,104,504 B2
(45) Date of Patent: Jan. 31, 2012

(54) METHODS AND APPARATUS FOR REMOVABLE LID WITH ULTRA FAST ACTION SPEED FOR RELIES COMPRESSED MEDIA, LIQUID OR COMPRESSED GAS

(75) Inventors: Vladislav Oleynik, Pittsboro, NC (US); Gennadiy Albul, Pittsboro, NC (US)

(73) Assignee: Umbrella Technologies, Inc.

( * ) Notice: Subject to any disclaimer, the term of this patent is extended or adjusted under 35 U.S.C. 154(b) by 374 days.

(21) Appl. No.: 12/565,049

(22) Filed: Sep. 23, 2009

(65) Prior Publication Data

US 2010/0071783 A1 Mar. 25, 2010

Related U.S. Application Data

(60) Provisional application No. 61/194,004, filed on Sep. 24, 2008.

(51) Int. Cl.
*F16K 17/00* (2006.01)
(52) U.S. Cl. ............ 137/467; 137/495; 251/66; 251/68; 251/72; 251/73; 251/74
(58) Field of Classification Search .................... 251/66, 251/68, 72, 73, 74; 137/467, 495, 527.2, 137/527.8
See application file for complete search history.

(56) References Cited

U.S. PATENT DOCUMENTS

| | | | | |
|---|---|---|---|---|
| 157,217 A * | 11/1874 | Pennington | ..................... | 169/10 |
| 660,400 A * | 10/1900 | Smith | ............... | 251/72 |
| 729,271 A * | 5/1903 | Bumpus | ...................... | 236/21 R |
| 812,001 A * | 2/1906 | Bilz | ................ | 169/10 |
| 1,304,965 A * | 5/1919 | Hammarstrom | ............. | 137/467 |
| 1,456,723 A * | 5/1923 | Derby | .............. | 169/19 |
| 1,755,497 A * | 4/1930 | Blalack | ........ | 200/85 R |
| 1,815,889 A * | 7/1931 | Bissonette | ....... | 137/80 |
| 2,052,275 A * | 8/1936 | Brittingham | .................... | 137/75 |
| 2,201,837 A * | 5/1940 | Schanck et al. | .............. | 137/467 |
| 2,342,589 A * | 2/1944 | Lewis | .............. | 169/19 |
| 2,382,720 A * | 8/1945 | Hopkins | ........................ | 251/68 |
| 2,542,080 A * | 2/1951 | Herrbold | ................... | 239/533.1 |
| 2,827,258 A * | 3/1958 | Muhler | ........................ | 251/72 |
| 2,856,953 A * | 10/1958 | Quist | ........................... | 137/467 |
| 2,900,029 A * | 8/1959 | Herkimer | ....................... | 169/22 |
| 4,289,039 A * | 9/1981 | Trunner et al. | ..................... | 74/2 |
| 5,449,015 A * | 9/1995 | Petkovic | ......................... | 137/38 |
| 7,125,058 B2 * | 10/2006 | Hawthorne | ............... | 294/82.28 |
| 2006/0065579 A1 * | 3/2006 | Thomson | ........................ | 210/97 |

* cited by examiner

*Primary Examiner* — John Rivell
*Assistant Examiner* — Minh Le

(57) ABSTRACT

An assembly is for extremely fast opened lids systems, where compressed gases or liquids or oils are used. Mainly, the removable lid is comprised of a lid, a lid platform, a dynamic hinging mechanism, and a releasing mechanism. A final action could be via means of mechanical or electrical via an action of a solenoid.

7 Claims, 7 Drawing Sheets

METHODS AND APPARATUS FOR REMOVABLE LID WITH ULTRA FAST ACTION SPEED FOR RELIES COMPRESSED MEDIA, LIQUID OR COMPRESSED GAS

TECHNICAL FIELD

This invention applicable to the apparatuses where need to delivery sudden opening in any diameter with ultra fast speed of opening, virtually make an opening in less then 1 ms for the tenth of the inch in diameter openings. Such apparatuses would be in a field of compressed gases, liquids and object motion, gas dynamics, pneumatic transportation, compressed gas propulsion and artillery. Applications region could be, but not limited to safety, propulsion, apparatus and system fast configuration change.

BACKGROUND

The necessity to have the super fast opening lid on the compressed gas lines dictate the design and all test methodic. Initial design incorporate mechanical opening arm and later has been incorporated solenoid activator, which improve the practicality of usage. Many similar fast action valves do not incorporate a loose part conception and that is main obstacle to achieve the super fast opening action of the operated lid. During the invention process, we are made a prototype and has in practice measure the acceleration and speed of the traveling lid.

BRIEF SUMMARY

Principal of current invention based on the "loose parts" design conception, which is not holds parts in place or together, after the actuator is activated. The main element of the super fast action lid is free standing part and during assembly become a portion of the whole design, where main function is to hold the pressure of compressed gas or liquid. Design could be consist one, two or more moving "loose part" design concept.

DETAILED DESCRIPTION

Principal of Operation

The basic principle of operation "loose hinge" design principle, where is a main element or elements hold together by meaning of removable or destroyable part. Such design will incorporate an "lock" or "pin" which is removed by meaning of action of solenoid or explosive or mechanical pull rope. In most cases action would be reversible and may be repeated after assembling.

Figure 1:
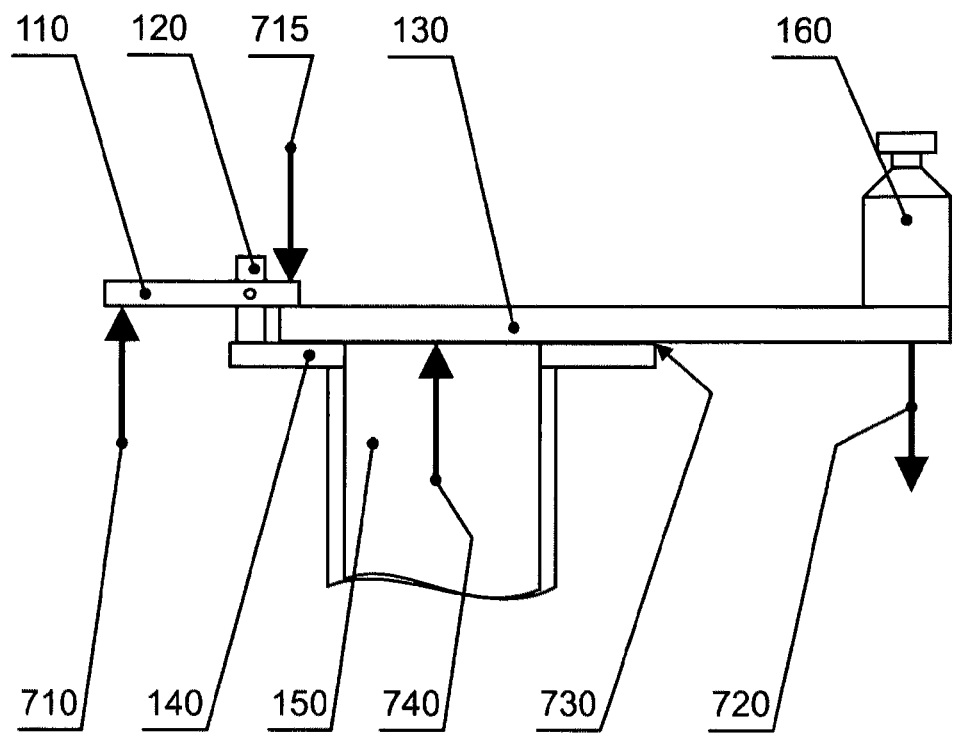
FIG. 1—Drawing for "loose hinge" design implementation
Figure 2:
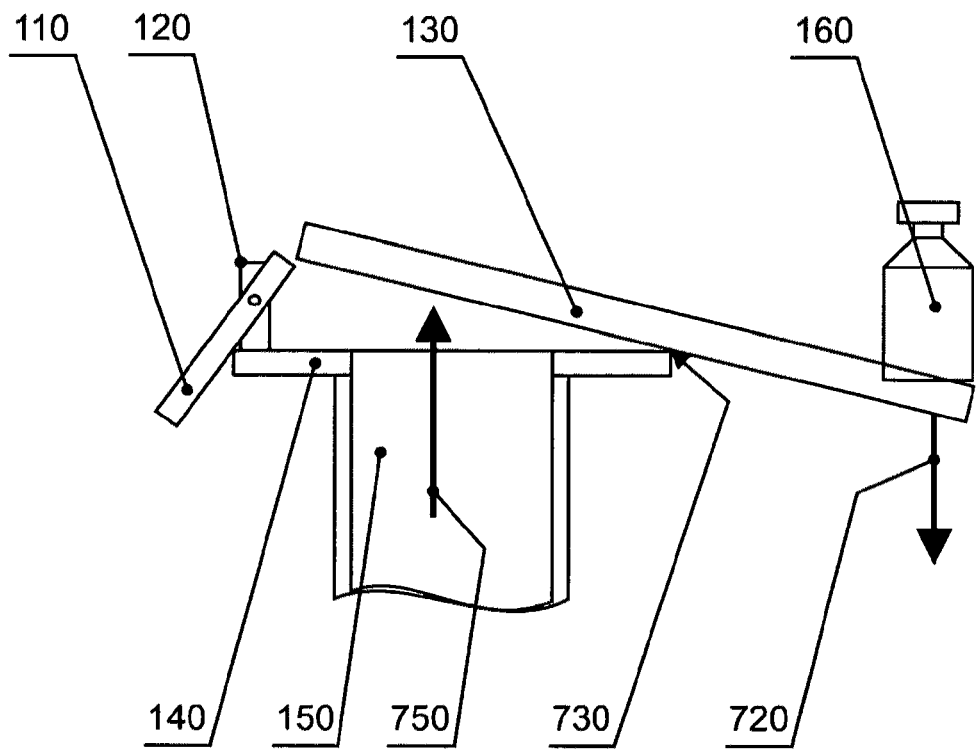
FIG. 2, 3, 4—Progress of the opening process
Figure 3:
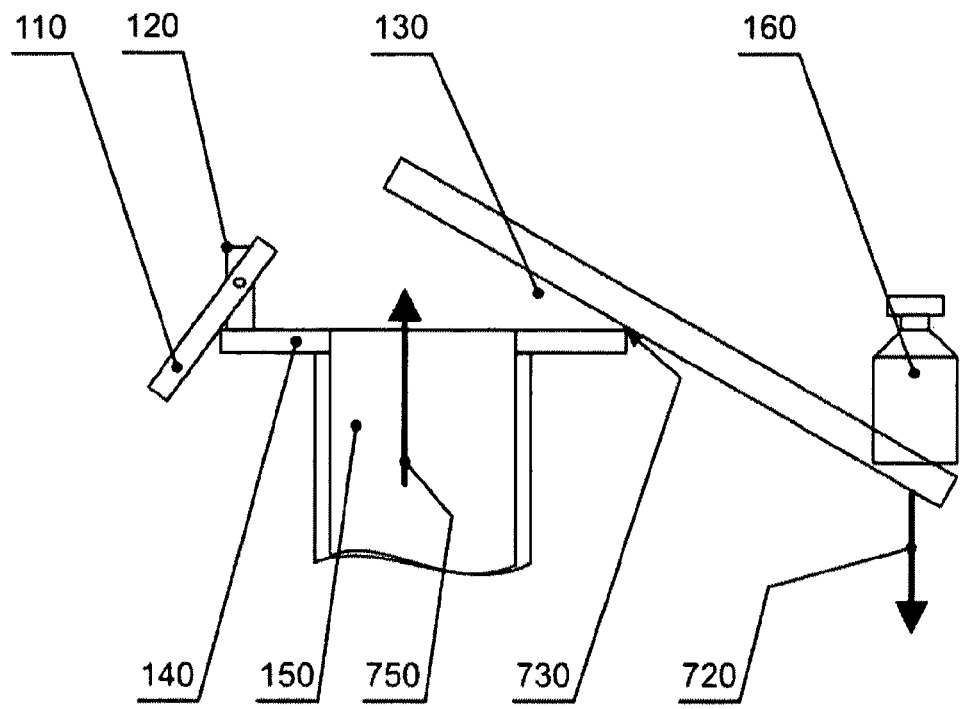
Figure 4:
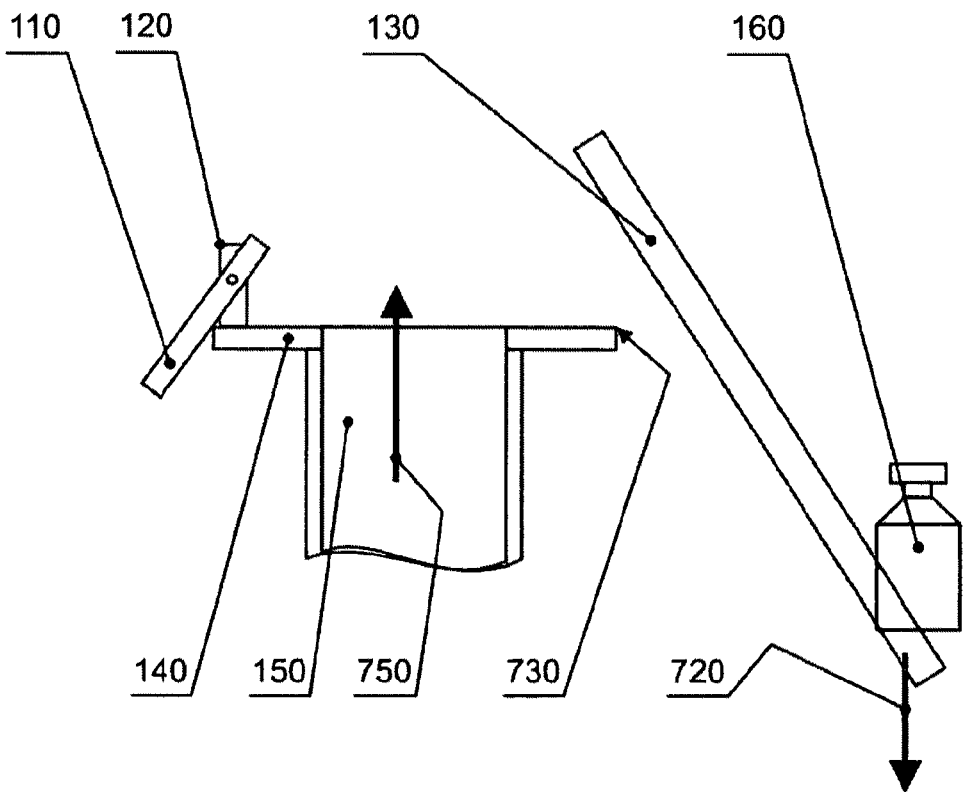

FIG. 1 depicts the drawing for "loose hinge" design implementation. The base (140, FIG. 1) of the fast acting valve, is the logical end of the pipe (150, FIG. 1) connected by meaning of welding or pipe thread connector with appropriate sealing. The lid (130, FIG. 1) is cover the pipe end attached to the base with meaning of sealing by O-Ring or another appropriate media or sealant, located between lid and base plate. One the one end it is secure with leverage (110, FIG. 1), connected via support (120, FIG. 1) with axis to the base by meaning of welding or another meaning of mechanical force. A force (710, FIG. 1) is applied to another end of the lever to induce holding force (715, FIG. 1) to the lid. On the other end, lid is loaded with weight (160, FIG. 1) or another meaning of load, for instance spring, and produce a force (720, FIG. 1) necessary to hold lid (130, FIG. 1) on a top of base (140, FIG. 1), provide the appropriate sealing of the pipe (150, FIG. 1) with force (740, FIG. 1). So, if pressure (710, FIG. 1) and (720, FIG. 1) is applied in proportion, a system become stable until pressure (740, FIG. 1) will overcome or pressure (720, FIG. 1) in combination with (710, FIG. 1) and (715, FIG. 1), so lid will lifted by force (740, FIG. 1) and media from the pipe will leak. Let assume we found the system balance with given media pressure. System will remain balanced until we hold the pressure (710, FIG. 1). After the pressure (710, FIG. 1) is absent, lever (110, FIG. 1) will start to move up under opposite pressure (715, FIG. 1), which is applied from the weight (160, FIG. 1) via arm of length of lid (130, FIG. 1), until a pivot point (730, FIG. 1) is reached. At this moment, a pivot point (730, FIG. 1) become a "virtual" hinge to move right side of the lid UP and right side DOWN with speed proportional of weight (160, FIG. 1) over arm length between position of the weight (160, FIG. 1) and point or "virtual" hinge (730, FIG. 1), plus an force of media (740, FIG. 1) applied to the lid from the pipe. Process will developed and escalated, since there is no stopping force except friction at the point of "virtual" hinge and air resistance. If arm length between point of applying weight force (720, FIG. 1) and "virtual" hinge and volume of weight (160, FIG. 1) is significant, this process will be more dramatic. Most important, during this process development, since there is no such things as a real hinge, a "virtual" hinge become a temporary point and a point of contact start to move towards a pipe opening and process escalating as it is shown on FIG. 2 and FIG. 3 with the final opening process stage depicted on FIG. 4.

Authors, during practical design, fabrication and testing the device described above find the tremendous moment of movement even with relatively small weight (160, FIG. 1) and relatively low pressures in the supplying pipe. A traveling lid demonstrates a recorded acceleration over 500 g with small design over 1¼ pipe opening with 100 psi air pressure.

Figure 5:
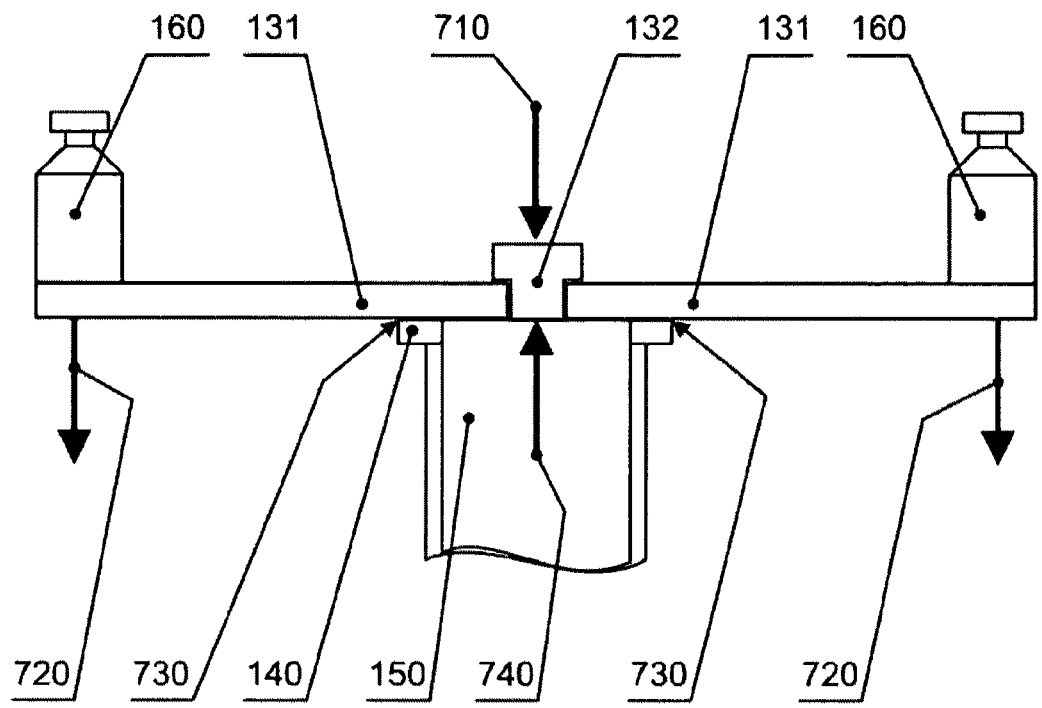
FIG. 5—"Loose hinge" design concept in application of multiple lid design.
Figure 6:
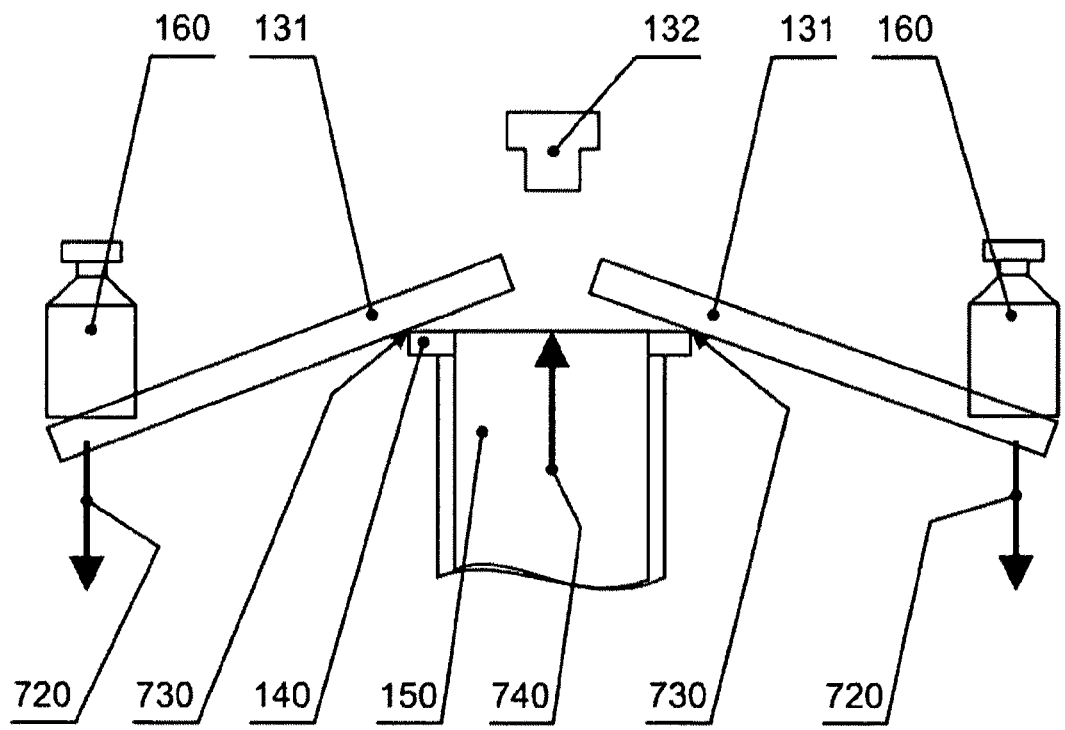
FIG. 6, 7—Progress of the opening process for the multiple lid design.
Figure 7:
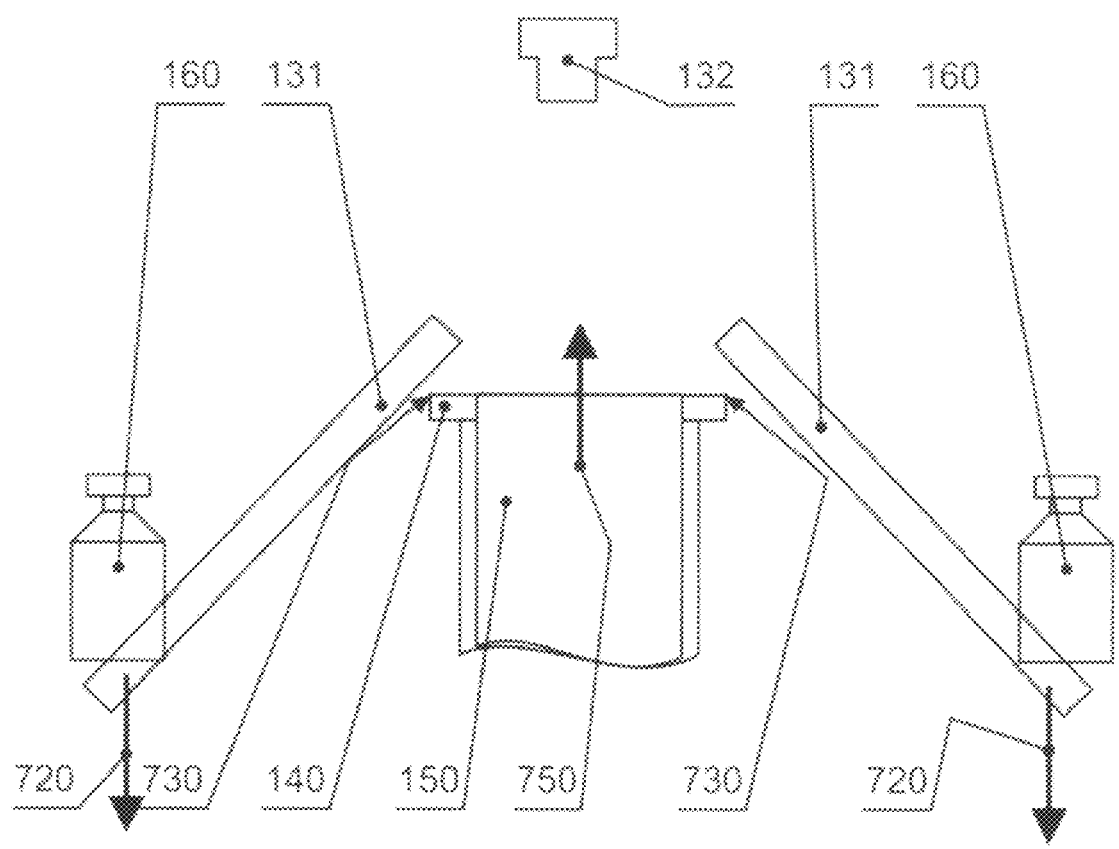

Another type of design shown on FIG. 5 with a "loose hinge" conception would be a similar as it was depicted on FIG. 1, but where instead one lid used a multiple lid elements (131, FIG. 5), segmented and connected to one central element (132, FIG. 5) which would be of meaning of removable or destroyable media. All elements of assembled lid is sealed between each other and against the base (140, FIG. 5) with meaning of sealing media which could be, but not limited to O-Ring type, or sealant. In static a holding force (710, FIG. 5) is applied to the center element (132, FIG. 5) and weight (160, FIG. 5) or other meaning of force (720, FIG. 5) applied to the ends of segmented lid (131, FIG. 5). Weight force (720, FIG. 5) and holding force (710, FIG. 5) is compensate each other with the static pressure (740, FIG. 5) applied. As soon as holding force (710, FIG. 5) is disappear, center holding element (132, FIG. 5) will move in direction of media force (740, FIG. 5), and release the lid elements (131, FIG. 5). As soon as lid elements (131, FIG. 5) released, they start to move under force (720, FIG. 5) DOWN, and process accelerated. All movement will be continuing over a "virtual hinge" (730, FIG. 5) as it shown on FIG. 6. But since there is nothing to hold a segmented lid (131, FIG. 6) at the "virtual hinge" (730, FIG. 6) spot, segmented lids (131, FIG. 6) will move towards weight (160, FIG. 6) force applied (720, FIG. 6) as it shown on FIG. 7. Compressed media (750, FIG. 5) is released. Since the proportion of arms in this case much more in favor to fast movement, authors suspect, the acceleration for each given segment will excide the volume for single lid design with same initial conditions.

Figure 8:
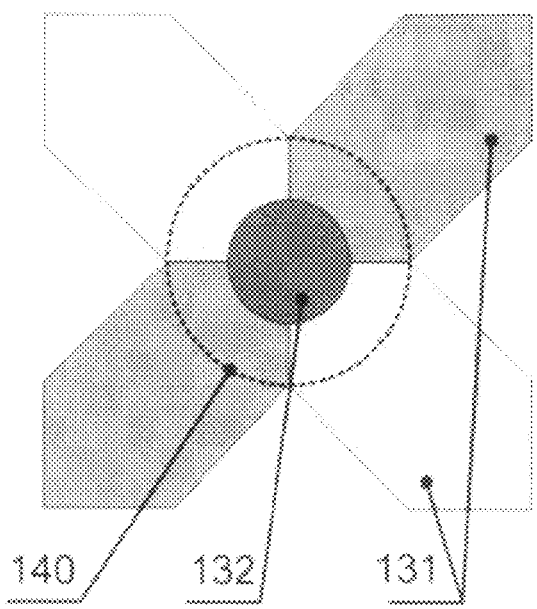
FIG. 8—Top view of 4 lid design

On FIG. 8 depicted a top view of the 4 lid (131, FIG. 6) design with the center element (132, FIG. 6) and base (140, FIG. 6) depicted by dot line. Weight or another meaning of weight force elements is not shown for clarity reason.

Also, need to note, at some design applications, it is important to hold a multiple lids together, to prevent a sudden self-disassembling during, but not limited to, transportation or storage. For this reason, during assembling, multiple lid design will be shrouded around by perimeter, by meaning of, but limited to, wire or tape windings, shrink media, or welded together. During usage or before, as it is called by design, shroud would be removed by meaning of explosive or sudden act element, for instance heating element. This design is not limited to be adding on function, but also could be used as a primary fuse to initiate the opening process. In this case, a holding force (710, FIG. 5) is applied in center or on perimeter of the assembled lid by meaning of hooks or another meaning, and initiating of opening process done by meaning of breakage of the shroud material.

Figure 9:
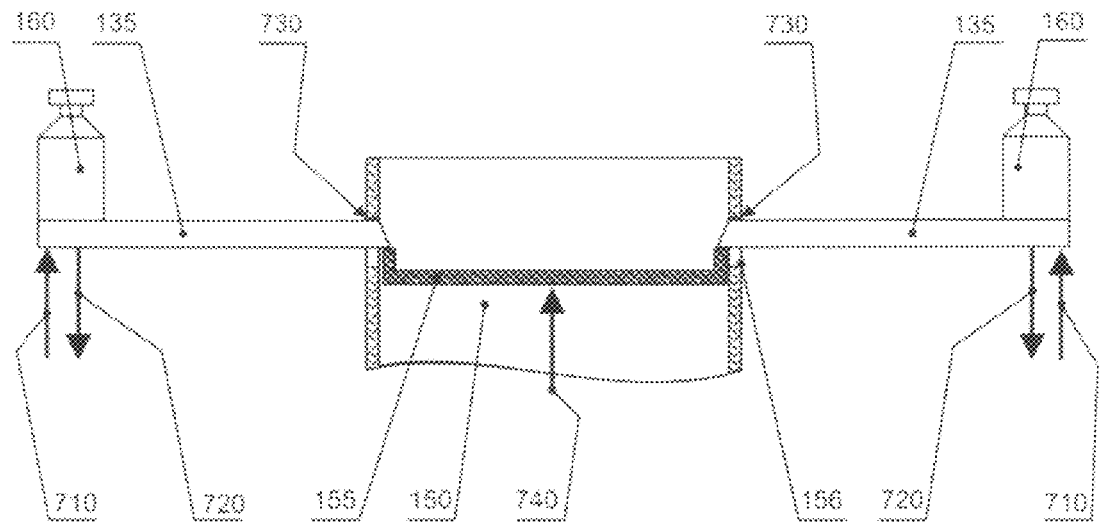
FIG. 9—Piston type fast acting valve
Figure 10:
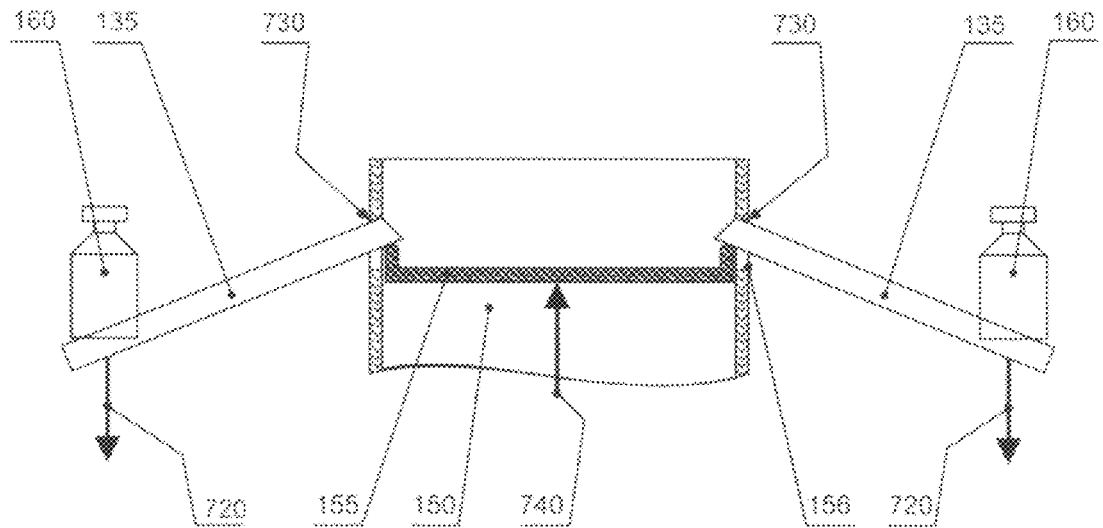
FIG. 10, 11, 12—Progress of the opening process for the piston type design
Figure 11:
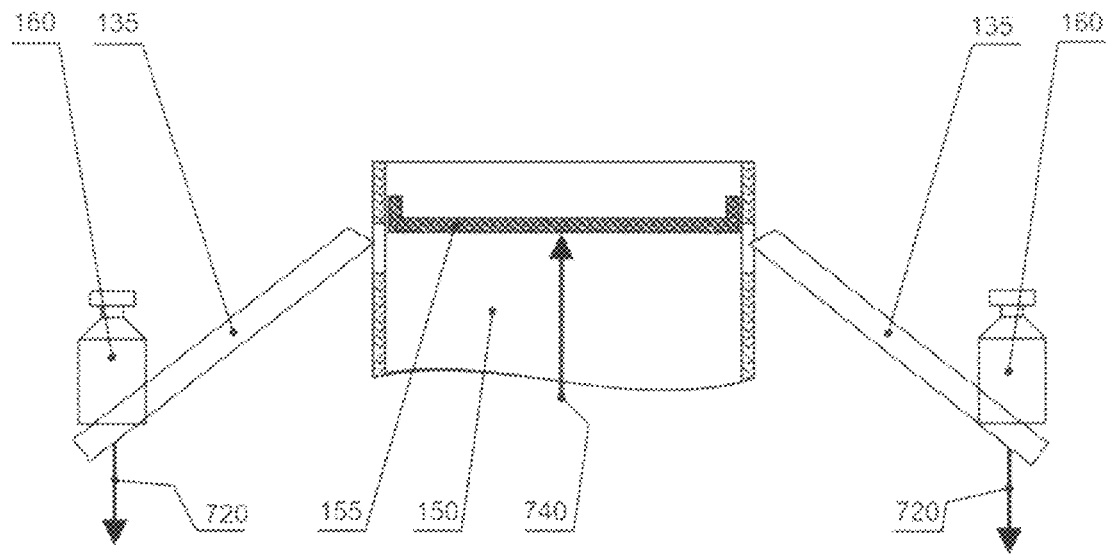
Figure 12:
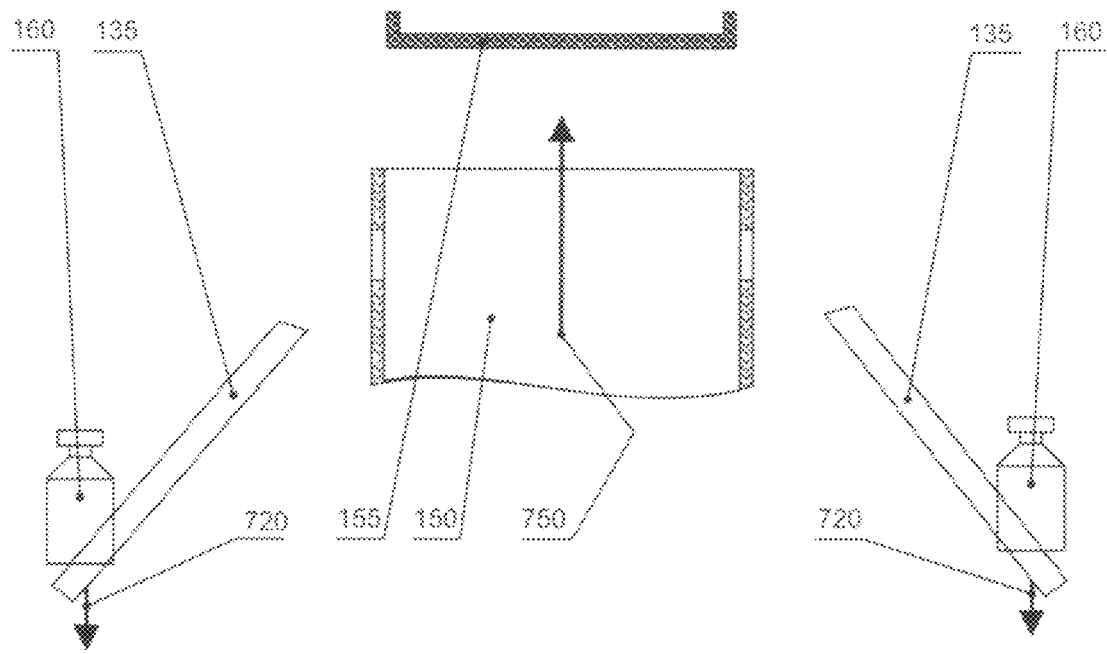

Design for the proposed "loose hinge" design could be different and implementation could cover wide spectrum of applications, but same principle will introduce the fast, and incredibly robust fast act valve for variety of applications. For instance, on FIG. 9 depicted another meaning of implementation of the "virtual hinge" design with a piston type fast acting valve. The pipe (150, FIG. 9) with a piston (155, FIG. 9) form a sealed end with media force (740, FIG. 9). A number of unhinged levers (135, FIG. 9) protruded via openings (156, FIG. 9) in pipe (150, FIG. 9) and holding a piston (155, FIG. 9) in place. In stationary position, a holding force (710, FIG. 9) applied to keep the system in balance, to compensate weight (160, FIG. 9) force (720, FIG. 9) and pressure of the media (740, FIG. 9). As soon as holding force (710, FIG. 9) is released, levers (135, FIG. 10) move DOWN and piston (155, FIG. 10) starts to move along media force (740, FIG. 10). Process continue to develop with exponential acceleration as it shown on FIG. 11, and finally piston (155, FIG. 12) leave the pipe opening (150, FIG. 12) and relies the pressure (750, FIG. 12), unhinged levers (135, FIG. 12) travel away.

The piston it self could be, but not limited to, a medium for connect another equipment to, or could have a conduits, but not limited to, for electrical or hydraulic connections from inner volume to outside.

In case if desirable, or it is call by the design, a lid or multiple lid elements, or center element or piston could be attached by meaning of holding from fly away, by, but not limited to, cable or chain, where is one side of the holding media attached to the element and another is stationary attached to desirable place, such as holding pole. This addition will hold all part from fly to far, and keep them for future usage. In development of this, could be design a basket or catching net which will prevent parts spreading as it is desire.

An individual, familiar with the art, without any difficulties would reconstruct the event sequence and will design appropriate apparatus following above description. Phenomena of unhinged design are just start to evolve.

For certain application, a center element could be used for solving different problems and different needs. One of application would use a center element like a conductor of force from inner volume to outside and provide socket to other applicable elements.

Another application could use center element like a conduit for electrical or other meaning of connection from inner space of the pipe to outer.

Figure 13:
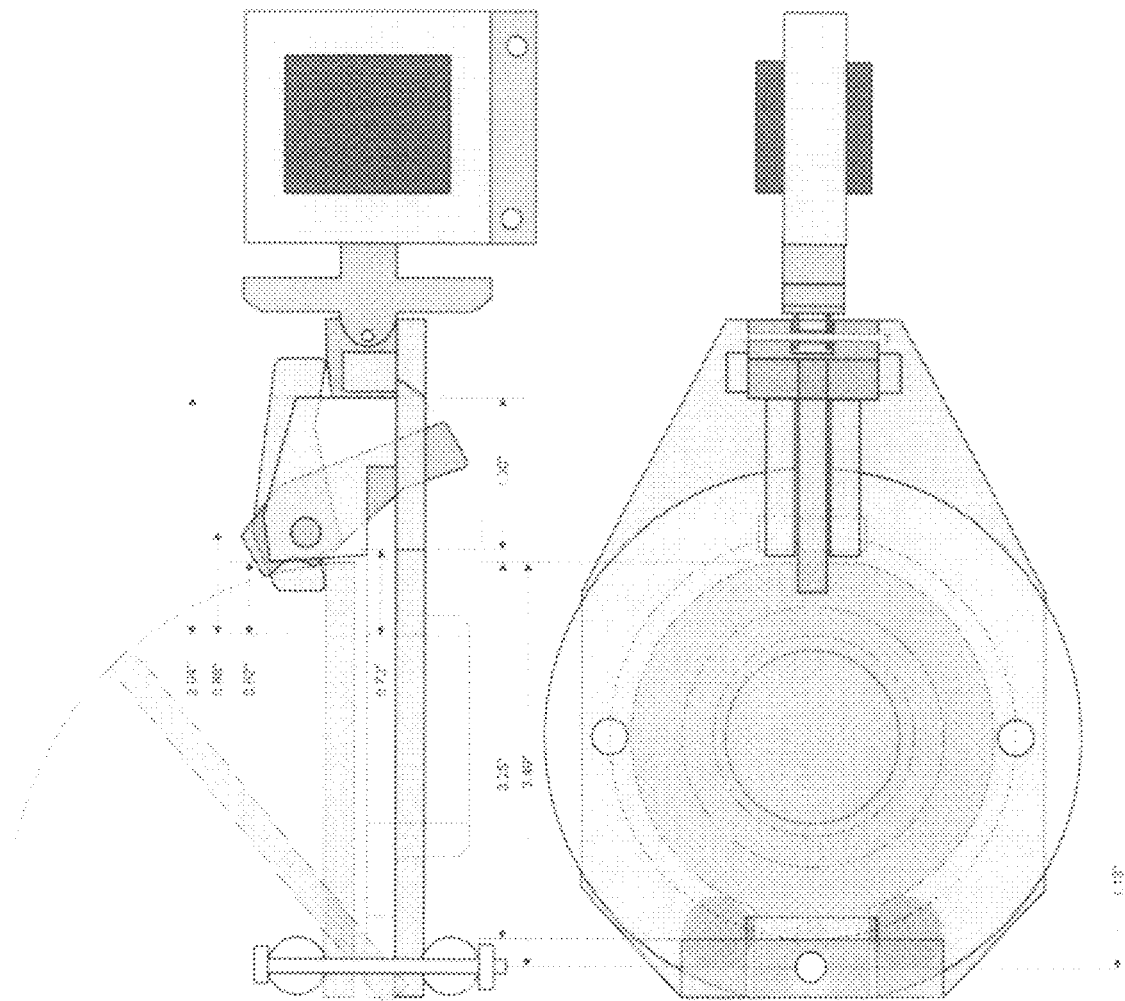
FIG. 13—Practical implementation of single lid design, sketch

A practical implementation presented on sketch FIG. 13.

What is claimed is:

1. Apparatus for a fast acting valve, comprising:
   a base;
   a lid;
   a latch; and
   a weight on an end of the lid opposite from the latch;
     wherein the base comprises a pivot point positioned to so that during a process of opening the valve, the lid accelerates radially and linearly toward the weight and accelerates.

2. The apparatus of claim 1, wherein:
   the lid comprises at least two segmented lid elements; and
   the weight comprises at least two weights, each of the two weights on an end of one of the segmented lid elements; and
   further comprising:
     a central element that contacts each of the at least two segmented lid elements.

3. The apparatus of claim 2, wherein the central element further comprises a shroud material.

4. The apparatus of claim 3, wherein the shroud material comprises at least one of a perimeter bonding media and a perimeter tape winding media.

5. The apparatus of claim 2, wherein the central element applies force and holds the at least two segmented lid elements together and in contact with the base.

6. The apparatus of claim 2, wherein the central element comprises at least one of an electrical conduit, a mechanical conduit, and a hydraulic conduit.

7. The apparatus of claim 2, wherein the central element is located at a position other than a center of the base, and the at least two segmented lid elements have different dimensions and each of the at least two weights comprises a different weight.

* * * * *